US005608807A

United States Patent [19]

Brunelle

[11] Patent Number: 5,608,807

[45] Date of Patent: Mar. 4, 1997

[54] AUDIO MIXER SOUND INSTRUMENT I.D. PANEL

[76] Inventor: Thoedore M. Brunelle, R.D. 1 Box 102M, New Milford, Pa. 18834-9741

[21] Appl. No.: 636,817

[22] Filed: Apr. 23, 1996

Related U.S. Application Data

[63] Continuation of Ser. No. 408,789, Mar. 23, 1995, abandoned.

[51] Int. Cl.[6] .......... H04B 1/00

[52] U.S. Cl. .......... 381/119; 84/625; 84/660; 84/697; 381/118

[58] Field of Search .......... 381/118, 119; 84/625, 660, 697

[56] References Cited

U.S. PATENT DOCUMENTS

| | | | |
|---|---|---|---|
| 4,479,240 | 10/1984 | McKinley, Jr. | 381/80 |
| 4,631,525 | 12/1986 | Serravalle, Jr. | 340/365 S |
| 4,730,533 | 3/1988 | Schoerkmayer | 84/478 |
| 4,757,736 | 7/1988 | Tajima et al. | 84/1.03 |
| 4,879,751 | 11/1989 | Franks et al. | 381/119 |
| 4,972,755 | 11/1990 | Tajima et al. | 84/477 |
| 5,060,272 | 10/1991 | Suzuki | 381/119 |
| 5,179,238 | 1/1993 | Hotta | 84/478 |
| 5,212,733 | 5/1993 | DeVitt et al. | 381/119 |
| 5,225,617 | 7/1993 | Hotta | 84/477 |
| 5,402,501 | 3/1995 | Silfrajt et al. | 381/119 |
| 5,444,789 | 8/1995 | Zampini et al. | 381/119 |

*Primary Examiner*—Curtis Kuntz
*Assistant Examiner*—Duc Nguyen

[57] ABSTRACT

A programmable identification panel used in conjunction with an audio mixing sound system. The identification panel includes a changeable visual display, such as a liquid crystal display, for identifying a specific instrument or sound that has been assigned to a particular channel on the audio mixing device. The invention is particularly useful to audio engineers in that it helps to distinguish channel identification for multiple musical configurations.

3 Claims, 2 Drawing Sheets

AUDIO MIXER SOUND INSTRUMENT I.D. PANEL

This application is a continuation, of application Ser. No. 08/408,789, filed Mar. 23, 1995, now abandoned.

FIELD OF THE INVENTION

The present invention relates to a device for mixing audio signals. More particularly, this invention relates to an audio mixing sound system which includes a programmable identification panel for labeling and identifying each particular instrument channel that is represented by a sound or audio signal on the mixer panel.

BACKGROUND OF THE INVENTION

To understand the present invention, one must first understand the use of a mixer and therefore what mixing is through the eyes of an audio engineer. A mixing console, or mixer, is a huge and often expensive tool for mixing various sounds/instruments together so that they can be put into a pleasing balanced composite. The mixing console consists of a table like layout having a series of dials and controls representing channel modules including faders, potentiometers, etc. Sounds may be played in live from the actual instrument, such as a guitar hooked into the mixer directly, or an instrument play live through a microphone hooked into the mixer. As more commonly done in studios, prerecorded sounds are taken off a multi-track tape recorder, such as an ALESIS ADAT, which records each instrument or sound separately on separate tracks that are locked together. These tracks get appropriately sent to individual channels on the mixing console, each controlled by the respective faders. It is the job of the engineer to sit in front of the mixing console, and as he is mixing, slide and/or alter the controls/faders that represent instruments he wishes to accentuate, soften or blend as the music or soundtrack progresses.

Perhaps the most difficult job for an audio engineer is to work with experienced musicians in an environment where music must be played over and over again to record a perfect piece of music in the ears of a musician. The audio engineer may spend hours routing channel assignments and manually activating controls in order to create such a mixing of audio signals. Great time is spent neatly writing and assigning a label to each channel, usually written on one very long strip of tape, which can be quite tedious and annoying to do if numerous musical scores are to be mixed or remixed in one studio session. Also should numerous hand-written labels be placed on the mixing console, it can be very difficult to keep the labels intact and in their proper position. The audio engineer is helped by a stable and neat labeling of channels to avoid problems while mixing which could make the engineer change the wrong channel, fader or other control if the channels are not properly identified.

One of the greatest frustrations to the mixing engineer, and to the studio owner of the beautiful piece of mixing equipment is that there is no sound or instrument channel identification on the mixer. The prior art fails to teach a mixing console having a simple visual identification such as, channel 1 is a bass drum, channel 2 being labeled perhaps as a snare, channel 3 being labeled perhaps tom toms, channel 4 possibly a rhythm guitar, or a bass; channels 5 and 6 sharing one instrument sound for fullness as stereo (ex. STEREO—right and left piano), channel 7 being a glockenspiel, channel 8 a harp, channel 9 being piano fill, channels 10 through 21 might be vocal takes, and so on. There might be channels of harmony tracks in vocals, etc., or full orchestra which would require more tracks, and with choir added, it could go to 128 tracks or more.

Usually, in larger mixers there is enough space above or below the faders to separate the fader or volume control from the series of its controls that stem upwards from it. In this space the engineer usually places a long strip of masking tape, or if there isn't a space broad enough, the engineer may stand papers and cards up against the dials and/or faders. Commonly the tape runs across the whole length of the mixer from left to right above/below the faders or dial controls for each channel of sound. The engineer then writes on this strip with a pen or marker the names of each sound or instrument assigned to each mixer fader/channel, hoping it is neat enough so that the ID tape of sounds and instruments line up visually well enough to avoid errors in his mix due to mistaking a channel/fader sound for the one next to it or another one if the engineer is very careless and sloppy. The masking tape visually identifies the names of the sounds or instruments that will be controlled by adjusting the dials and/or fader in a particular group, row or rows.

In most cases, the name of the piece of music, or soundtrack is also noted somewhere on this strip to identify what piece of music or soundtrack had this particular grouping of instruments on their respective channel assignments. This will vary greatly depending on the piece of music being played.

The engineer, when doing the mix, selectively slides the faders that represent instruments he wishes to accentuate or wishes to soften or blend as the music or soundtrack progresses. The engineer constantly refers to the ID strip or label he has placed on the mixer to remind him where each instrument sound or channel is able to be maneuvered. As he constantly glances at the strip it reminds and guides him during his mixing of instrument sound control. It is not uncommon to have 32 sounds or more on a mixer and therefore 32 faders may have to be moved at various times. For example, a ping of a bell that may want to be emphasized, or a sound of rumbling thunder that may want to be diminished in a spot, or a harp that may be drowned out by the strings and needs a boost in sound, a push up of the fader where angelic sounds may come in will need the engineer to be ready to adjust those sounds exactly at a given moment. The engineer is like a madman of sound, sliding faders and moving control knobs to emphasize and de-emphasize sound on the various mixing channels as the sound is being heard by him, identified on the console and altered by him. Without visual instrument or sound identification, it would be difficult to remember the instrument or sound order for any piece of music. Easy visual identification is essential.

After the mixing is complete, or the first mix is done, then the very long piece of masking tape is stored, often on metal doors or cabinets or on a wall until the piece is ready for another mix. Usually this requires putting many long strips of tape on doors which is not the handiest or most aesthetic thing in a richly laid out studio. If the music piece has to be re-mixed, the masking tape labels must be again laid carefully on the mixer, each ID having to line up with the right fader. It is possible that a new ID strip of masking tape may need to be made and carefully laid on the mixer over the fader channels, lining up each instrument name written on the tape with the appropriate fader alignment if something should happen to the tape in the course of the recording and mixing. Tape not only can be damaging to the mixer console but a great deal of time is wasted in labeling the channels or realigning the labels necessary to mix the musical score, not to mention the wasted valuable studio time. Moreover, after a musical piece is thought to be finished and the tape discarded, sometimes the producer or musician is disturbed by an unpleasing sound or lack of brilliance or volume of some instrument, vocal, or sound or group of any one of these, and a new mix or a re-mix may be required. A new piece of tape must be painstakingly made from the track sheets. Most engineers become annoyed and distracted from the musical flow of things by this necessary task.

Aside from the sheer lack of aesthetics in using tape on a beautiful piece of expensive equipment, the present invention would eliminate the unsightly assault to the body of the mixer, a precious piece of equipment, and more importantly, eliminate a great frustration to the engineer. When more than one sound is recorded, one after the other on the same track, to save tracks since they are limited, their correct ID name displayed could be sequenced as the instruments change to avoid confusion. The programmable ID label will give clear and definite identification for each mixing channel and its instrument assignment chosen by the engineer as for the particular soundtrack or piece written by the composer/arranger. If a re-mix is required at a later date, all the ID labels could be easily recalled from an automated computer. How many instruments or voices to be used will vary and often the placement of instrument positions or assignments to various channels on the mixer will be unique to the engineer and how he groups sound in his mind for the particular musical piece. He must have a coordinated, effective response physically so that he moves his hands over the controls and faders simultaneously with his hearing desires.

SUMMARY OF THE INVENTION

The present invention in general features an audio mixing device which includes a changeable visual display for identifying the specific instrument or sound that has been assigned to each channel. By providing a programmable label which defines the name of each sound onto an LED/LCD ID strip or other type of display right on the mixer, placed above or below the corresponding faders on the mixer, the engineer would not only have things neater and more psychologically favorable for performing the mix correctly the first time, but changes in the arrangement of instrument sounds would not require cross outs or the need for a new cumbersome labeling on a sloppy masking tape strip. Mixing will be more accurate, and more easily engineered, not to mention, pleasurable, especially where pieces require 32 tracks or more, and especially when pieces are long and may require sound effects while music must still be balanced underneath or when several sounds may be used on a track to save room. This LED/LCD ID strip, in addition to allowing easier visual ID switching instrument positions/names, etc., will do away with the problem of writing the masking tape strips and rewriting new strips when a new piece is going to be played, newly mixed or re-mixed. Via computer interface, one can easily include the title of the piece or music on the display and recall through that title, or code, the entire piece or soundtrack with name and instruments and placed on a given channel through the usual memory recall when switching between musical pieces.

Loading a piece for a re-mix will now be convenient and recalling the visual ID labels will be neat and easily done. Commands for identification label display will be entered and changed via computer keyboard. Saving and recalling will be conducted through the standard saving memory process.

Not only will sound identification per mixer channel be of great value in doing a mix, but it will clearly be in keeping with the majesty of the physical body of the mixing console and give to the mixer a dignity which it deserves since it is the king of sound. A mixer determines exactly how instruments played together are going to sound as a group and will determine what the recording is going to sound like in the final production.

Other advantages and features of the invention will be apparent from the following description in a preferred embodiment and from the claims thereof.

DESCRIPTION OF THE PREFERRED EMBODIMENT

Figure 1:
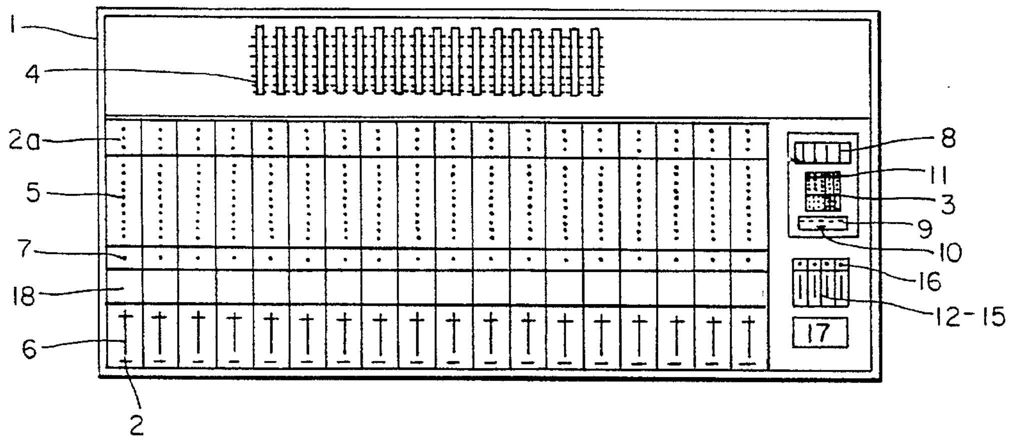
FIG. 1 is an external overhead view of an audio mixing device formed an embodiment of the present invention.

Referring first to FIG. 1, the audio mixer device 1 shown comprises a generally rectangular casing having a plurality of channel modules 2 extending vertically from the top to bottom. As shown in the enlarged view of FIG. 3, each channel module 2 is formed of an input/output channel 2*a*, auxiliary control knobs 5, a routing control switch 7, an identification display panel 18 and a fader slide 6. The input/output channels 2*a* each have a connector (not shown) for connection with a line leading from a respective signal source, which may be a microphone, a speaker, recording device or other various types of transducers. Just below input/output channels 2*a* are a plurality of auxiliary control knobs 5 for varying the parameters and characteristics of the input/output signal. Further, each input/output channel 2*a* has a routing control switch 7 which is used for making selective interconnections between the input/output channel 2*a* and any of a number of secondary channels 3, positioned on the right-hand side of the mixer device. The identification display panel 18 is used to namely mark each channel as an instrument or sound. The volume of each channel module is controlled by the fader slide 6. Additionally, each channel module 2 corresponds to an output meter 4 located at the top of the mixer device 1. The output meter 4 indicates the level of audio sound for each channel module 2.

The secondary channels 3 include ten controls arranged vertically in five stereo pairs, with the upper right-hand region occupied by five meter bridges 8, used to indicate the status of each corresponding secondary channel 3. The secondary channels 3 have channel routing control switches indicated by push-buttons 9 and are grouped in pairs with a single control switch 10 determining connections of the two channels of a pair to selected input channels. Each secondary channel pair has a pan control knob 11 which directs a proportion of the signal on a channel to each of the left/right channel parts and the outputs from the secondary channels are fed to the left or right output channel in proportion determined by the pan control knob 11.

On the right-hand side of the routing control switches 7, are four switches 12–15 for selecting a kind of audio effect as the effect functions are arranged. The effect, for example, may be a chorus effect or a reverberation effect, which can be easily selected and balanced within the mixer device through switches 12–15. On each of the switches 12–15, a light-emitting diode (LED) 16 is provided for indicating that particular switch has been selected.

Located in the lower left-hand corner of the mixer device, just below switches 12–15, is a signal processing interface circuit 17 which applies signal processing instructions to the input of an identification display panel 18. The signal processing instructions originate, via a standard communications bus 19, from a remote computer terminal 20, as shown in FIG. 2, which will be discussed in further detail later.

The specific interconnections of the mixer channel modules, switches, etc. are well known in the art and because these interconnections do not form an inventive feature of the present invention, they will not be discussed in any further detail.

Figure 3:
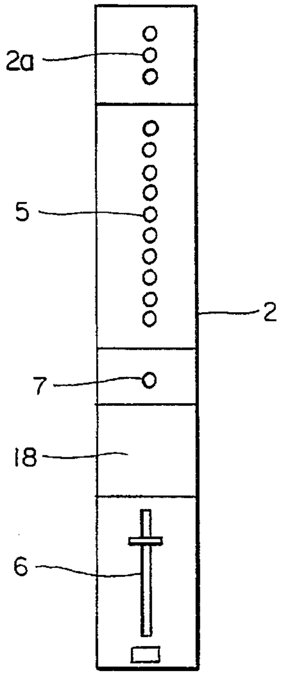
FIG. 3 is a diagram showing an enlarged view of a channel module to show the subject
Figure 2:
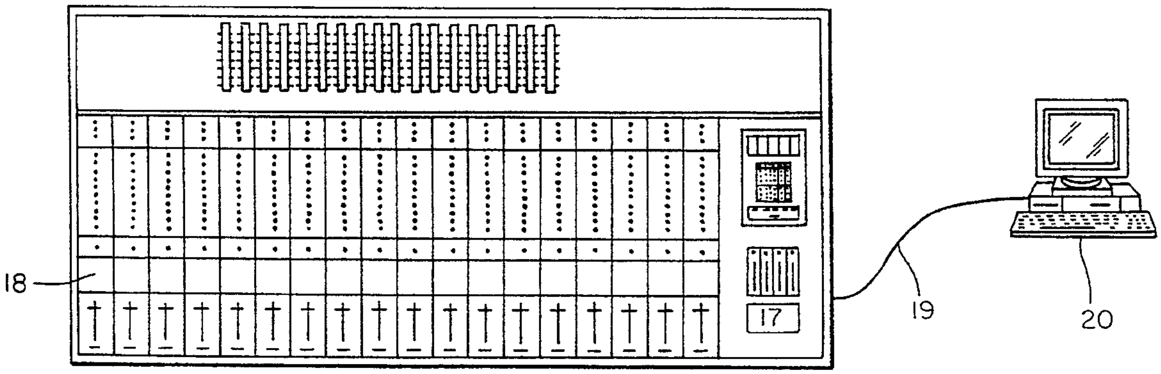
FIG. 2 is diagram showing the audio mixing device linked to a remote computer terminal.

The subject identification display panel 18, as shown in FIGS. 1–3, is made of a liquid crystal display, LED, or other type of display. The display panel 18 spans across the length of the mixer device, from left to right, just above the faders 6 and below the routing control switches 7. The display panel 18 may include a continuous segmented screen strip or a multiplicity of individual segmented screens corresponding to each channel module 2. Although the preferred embodiment includes a continuous segmented screen strip, in any form the display panel provides a clear programmable ID of each channel module as set by an audio engineer.

As shown in FIG. 2, the programmable identification display panel 18 is changeable, via the external remote computer terminal 20. The remote computer terminal 20 communicates to the signal processing interface 17 located on the mixer device 1 via a standard communications bus 19. The information programmed in the display panel 18 provides the identification of each instrument or sound corresponding to the channel module in connection with each piece of music or sound recording being mixed. The identification information in the display panel 18 is changed as necessary and at any time with very little trouble to the audio engineer.

Figure 4:
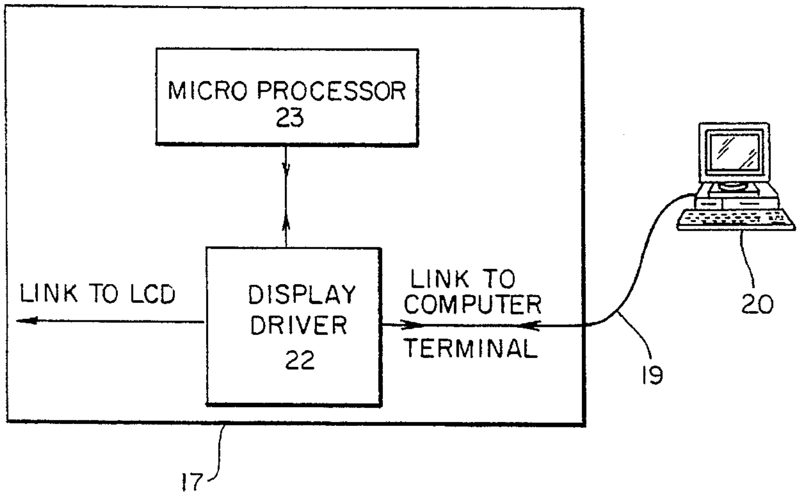
FIG. 4 is a diagram showing the subject signal processing interface located on the audio mixing device.

FIG. 4 shows the internal diagram of the signal processing interface 17, located on the right bottom corner of the mixer device 1. The interface 17 includes a display driver 22 connected to a micro-processor 23, which as instructed by the remote computer terminal 20, will provide a means for automatically changing the identification display panel 18. The audio engineer may wish to label each identification display panel 18 a specific instrument or sound according to the musical score he will be working with. The audio engineer does so by creating his musical configurations, using a standard audio processing software, and typing his instructions into the remote computer terminal 20. Commands are routed from the remote computer terminal 20, via communications bus link 19, to the onboard microprocessor 23 which then instructs the display driver 22 to display each labeled channel module 2 accordingly. Each programmed labeled channel module 2, representing a specific musical score, can be easily changed or even stored in a standard memory means at the remote computer terminal 20. The programmable labels can then be recalled later for further adjustment as a re-mix is needed.

A further embodiment, not shown in any of the Figures, would allow the onboard micro-processor 23 to function as the main programmable control, thus eliminating the need for an external computer terminal. Accordingly, audio configurations and changes to the programmable display ID panel 18 could be conducted right on the mixer itself.

Figure 5:
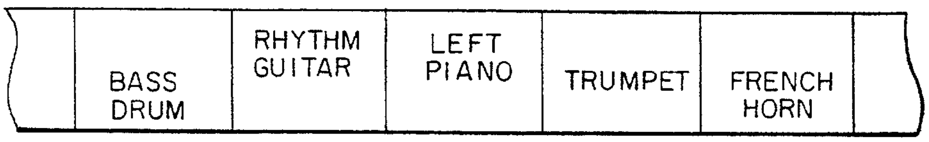
FIG. 5 is an enlarged diagram of the subject identification display panel.

FIG. 5 shows an example layout of the preferred embodiment for the subject identification display panel 18. The panel 18 is shown as one continuous segmented strip where the audio engineer types in, via computer, enough letters or any alphanumeric information to identify the instrument or sound of the channel module, such as trumpet, drum, piano, guitar etc. The identification data could be entered to identify either one instrument per channel or in the case of stereo, one instrument per two channels, a left and right of that particular instrument. The display panel 18 further provides enough space for the engineer to type in two-three abbreviations recognizable to the engineer, such as lft. piano, rthm guitar, etc.

The identification data typed in could take various forms or positions. For instance, each channel identification panel display area could include a top and bottom row. In the top row, each identification might include information specifically directed to that particular instrument such as, left, right or rhythm. The bottom row could identify the instrument itself, a trumpet, drum, piano or guitar. Another example may be that of song identification, i.e. the title, could be typed in the top row and the instruments on the bottom row. In any case, the various forms of the display panel depend on how the audio engineer wishes to set up his display panel in accordance with the degree of difficulty of the piece of music that he is mixing.

It is to be understood the subject identification panel could be used in conjunction with other types of audio arrangement equipment and/or musical instruments which require numerous musical sounds. It is thus believed that the operation and construction of the present invention will be apparent from the foregoing description. While the apparatus and system shown and described have been characterized as being preferred it will be obvious that various changes and modifications may be made wherein without departing from the spirit and scope of the invention.

I claim:

1. A mixing console for mixing sounds of instruments having a table layout with a series of dials and controls representing channel modules, each channel module having a routing control switch and a fader slide, said console comprising:

an instrument identification label, said label having a plurality of identification displays, each display providing visual identification of a musical instrument that has been assigned to each channel module;

a control means external to said console for programming and changing each identification display; and, a memory means within said control means that store a plurality of programmable configurations that form said identification displays.

2. A mixing console as recited in claim 1, said mixing console identification displays located on said table layout between each corresponding routing control switch and each fader slide.

3. A mixing console as recited in claim 2, said mixing console instrument display label having LED displays.

* * * * *